(12) United States Patent
Ranganathan et al.

(10) Patent No.: US 10,818,409 B2
(45) Date of Patent: Oct. 27, 2020

(54) CABLES WITH IMPROVED COVERINGS AND METHODS OF FORMING THEREOF

(71) Applicant: General Cable Technologies Corporation, Highland Heights, KY (US)

(72) Inventors: Sathish Kumar Ranganathan, Indianapolis, IN (US); Vijay Mhetar, Conroe, TX (US); Sean W. Culligan, Zionsville, IN (US)

(73) Assignee: GENERAL CABLE TECHNOLOGIES CORPORATION, Highland Heights, KY (US)

( * ) Notice: Subject to any disclaimer, the term of this patent is extended or adjusted under 35 U.S.C. 154(b) by 332 days.

(21) Appl. No.: 15/937,280

(22) Filed: Mar. 27, 2018

(65) Prior Publication Data

US 2018/0218805 A1 Aug. 2, 2018

Related U.S. Application Data

(62) Division of application No. 14/616,097, filed on Feb. 6, 2015, now abandoned.

(Continued)

(51) Int. Cl.
*H01B 3/44* (2006.01)
*H01B 13/14* (2006.01)
(Continued)

(52) U.S. Cl.
CPC .......... *H01B 3/441* (2013.01); *B29C 48/022* (2019.02); *B29C 48/15* (2019.02); *B29C 48/154* (2019.02);
(Continued)

(58) Field of Classification Search
CPC ........ H01B 3/441; H01B 3/28; H01B 13/145; H01B 13/22; H01B 7/02; H01B 13/0013;
(Continued)

(56) References Cited

U.S. PATENT DOCUMENTS 3,919,358 A 11/1975 Batiuk et al.
4,031,169 A 6/1977 Morris
(Continued)

FOREIGN PATENT DOCUMENTS

EP 1602686 A1 12/2005
WO 9852197 A1 11/1998
(Continued)

OTHER PUBLICATIONS

Marsitzky, Dirk; Extended European Search Report, Application No. 15746846.3, including the supplementary European search report and European search opinion; dated Aug. 21, 2017; 6 pages.
(Continued)

*Primary Examiner* — Jeffrey M Wollschlager
(74) *Attorney, Agent, or Firm* — Ulmer & Berne LLP

(57) ABSTRACT

A cable including a conductor surrounded by a covering layer, the covering layer formed from a thermoplastic vulcanizate composition which includes a continuous phase and a dispersed phase. The continuous phase is formed of a thermoplastic polyolefin. The dispersed phase is formed of a cross-linked elastomeric polyolefin. The thermoplastic vulcanizate composition passes the Hot Creep Test at 150° C. in accordance with UL 2556 (2013) and has a dielectric loss of 3 or less. Methods of forming cables with coverings are also disclosed.

20 Claims, 1 Drawing Sheet

Related U.S. Application Data

(60) Provisional application No. 61/937,256, filed on Feb. 7, 2014.

(51) Int. Cl.
| | | |
|---|---|---|
| *C08L 23/14* | (2006.01) | |
| *H01B 3/28* | (2006.01) | |
| *C08L 23/12* | (2006.01) | |
| *C08L 23/16* | (2006.01) | |
| *C08K 3/34* | (2006.01) | |
| *H01B 13/24* | (2006.01) | |
| *B29C 48/15* | (2019.01) | |
| *B29C 48/00* | (2019.01) | |
| *B29C 48/154* | (2019.01) | |
| *H01B 13/00* | (2006.01) | |
| *B29K 23/00* | (2006.01) | |

(52) U.S. Cl.
CPC ............... *C08K 3/34* (2013.01); *C08L 23/12* (2013.01); *C08L 23/14* (2013.01); *C08L 23/16* (2013.01); *H01B 3/28* (2013.01); *H01B 13/14* (2013.01); *H01B 13/145* (2013.01); *H01B 13/148* (2013.01); *H01B 13/24* (2013.01); *B29K 2023/00* (2013.01); *B29K 2023/06* (2013.01); *B29K 2023/10* (2013.01); *B29K 2023/12* (2013.01); *B29K 2023/16* (2013.01); *C08L 2203/206* (2013.01); *H01B 13/0013* (2013.01); *Y10T 428/2933* (2015.01); *Y10T 428/2962* (2015.01)

(58) Field of Classification Search
CPC ...... H01B 13/14; H01B 13/148; H01B 13/24; C08K 3/34; C08L 23/16; C08L 23/12; C08L 23/14; C08L 2203/206; Y10T 428/2962; Y10T 428/2933; B29C 48/15; B29C 48/154; B29C 48/022; B29K 2023/16
See application file for complete search history.

(56) References Cited

U.S. PATENT DOCUMENTS

| | | | |
|---|---|---|---|
| 4,036,912 A | 7/1977 | Stricharczuk | |
| 4,110,414 A | 8/1978 | Lindsay et al. | |
| 4,128,523 A * | 12/1978 | Britton | C08L 23/16 524/525 |
| 4,835,204 A * | 5/1989 | Carfagnini | C08K 5/09 524/291 |
| 5,246,783 A | 9/1993 | Spenadel et al. | |
| 5,656,693 A * | 8/1997 | Ellul | C08L 23/16 525/171 |
| 5,869,591 A | 2/1999 | McKay et al. | |
| 6,277,916 B1 | 8/2001 | Terbrueggen et al. | |
| 6,329,454 B1 | 12/2001 | Krabbenborg | |
| 6,376,623 B1 | 4/2002 | Hoenig et al. | |
| 6,380,312 B1 * | 4/2002 | Maldonado | C08L 23/16 525/191 |
| 6,384,093 B1 | 5/2002 | Bourland et al. | |
| 6,451,894 B1 | 9/2002 | Srinivasan et al. | |
| 6,861,143 B2 | 3/2005 | Castellani et al. | |
| 8,487,185 B2 | 7/2013 | Machl et al. | |
| 2002/0055567 A1 | 5/2002 | Romenesko et al. | |
| 2003/0176552 A1 * | 9/2003 | Hase | C08L 23/16 524/433 |
| 2004/0116605 A1 * | 6/2004 | Nishihara | C08L 23/0815 525/192 |
| 2004/0122190 A1 | 6/2004 | Cady et al. | |
| 2006/0014903 A1 * | 1/2006 | Vromman | C08L 101/00 525/192 |
| 2007/0051450 A1 * | 3/2007 | Donazzi | H01B 13/00 156/54 |
| 2007/0112138 A1 * | 5/2007 | Noordermeer | C08L 23/16 525/192 |
| 2007/0173613 A1 | 7/2007 | Chaudhary et al. | |
| 2007/0282073 A1 | 12/2007 | Weng et al. | |
| 2007/0284787 A1 | 12/2007 | Weng et al. | |
| 2007/0299160 A1 * | 12/2007 | Delanaye | C08L 23/10 523/218 |
| 2008/0227887 A1 | 9/2008 | Klier et al. | |
| 2010/0307822 A1 * | 12/2010 | Schmidt | H01B 7/295 174/74 R |
| 2011/0172327 A1 * | 7/2011 | Camillo | H01B 3/28 523/173 |
| 2011/0200290 A1 | 8/2011 | Batlle i Ferrer et al. | |
| 2011/0315423 A1 | 12/2011 | Karayianni | |
| 2012/0225291 A1 * | 9/2012 | Karayianni | C08K 5/0066 428/375 |
| 2012/0261163 A1 | 10/2012 | Tai et al. | |
| 2013/0269976 A1 | 10/2013 | Sarkar et al. | |

FOREIGN PATENT DOCUMENTS

| | | |
|---|---|---|
| WO | 2007019088 A1 | 2/2007 |
| WO | 2008060549 A1 | 5/2008 |
| WO | 2010011418 A2 | 1/2010 |
| WO | 2012084055 A1 | 6/2012 |
| WO | 2013090024 A1 | 6/2013 |
| WO | 2015009562 A1 | 1/2015 |

OTHER PUBLICATIONS

Thomas, Shane; International Search Report and Written Opinion of the International Searching Authority, issued in International Application No. PCT/US2015/014799; dated Apr. 29, 2015; 7 pages.

Marsitzky, Dirk; Office Action issued in European Patent Application No. 15746846.3; dated Apr. 6, 2020; 3 pages.

\* cited by examiner

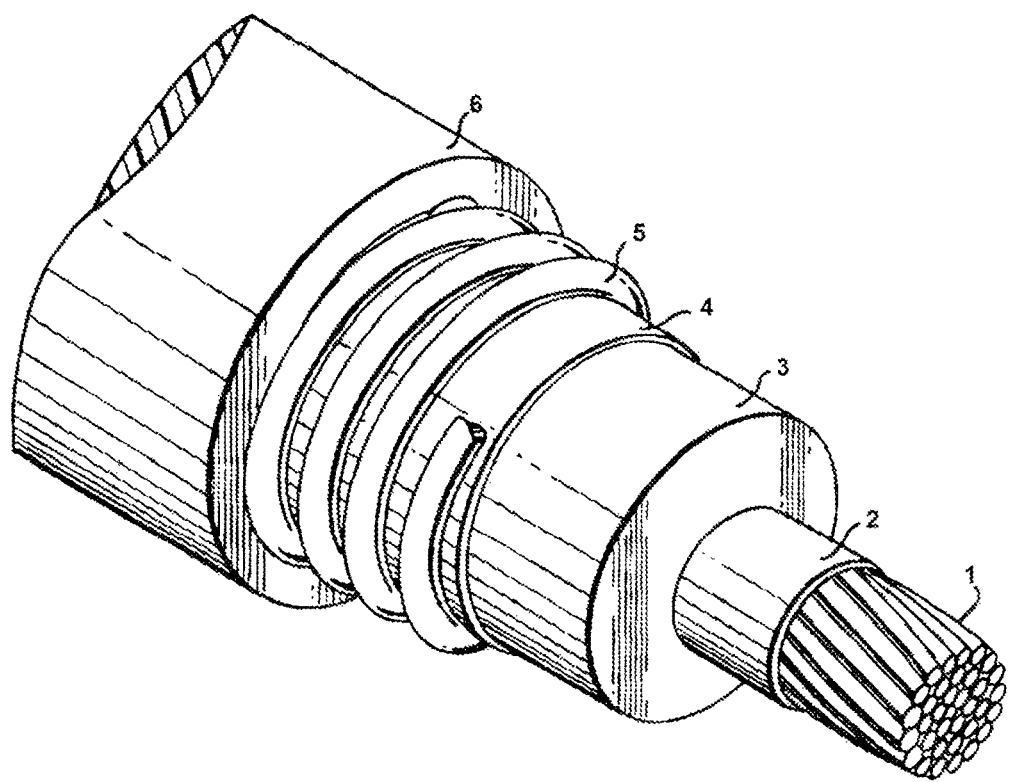

CABLES WITH IMPROVED COVERINGS AND METHODS OF FORMING THEREOF

REFERENCE TO RELATED APPLICATION

The present application claims the priority of U.S. application Ser. No. 14/616,097, entitled CABLES WITH IMPROVED COVERINGS AND METHODS OF FORMING THEREOF, filed Feb. 6, 2015, and hereby incorporates the same application herein by reference in its entirety. The present application also claims the priority of U.S. provisional application Ser. No. 61/937,256, entitled CABLE WITH RECYCLABLE COVERING, filed Feb. 7, 2014, and hereby incorporates the same application herein by reference in its entirety.

TECHNICAL FIELD

The present disclosure generally relates to thermoplastic vulcanizate compositions for cable insulation and jacket layers which exhibit improved processability as well as low dielectric loss and low creep over time.

BACKGROUND

Conventionally, cable insulation and jacket layers for medium and high voltage applications have employed cross-linked materials to maintain a cable's shape at high operating temperatures (e.g., 90° C. to 105° C.) and at high emergency peak temperatures (e.g., 130° C. to 150° C.). Examples of such cross-linked materials have included polyolefin-based cross-linked compounds and resins, including cross-linked polyethylene ("XLPE"), elastomeric ethylene/propylene ("EPR"), and ethylene/propylene/diene ("EPDM") cross-linked copolymers. The curing of such materials, however, have required a high energy curing process and have also required a degassing step to remove volatile chemicals entrapped during the curing process. Both of these steps are disadvantageous as they require considerable quantities of both time and energy. There is, therefore, a need to efficiently produce cables that meet the thermal, physical, mechanical, and electrical requirements necessary for medium and high voltage cables while requiring less time and energy.

SUMMARY

According to one embodiment, a cable includes a conductor and a covering layer surrounding the conductor. The covering layer is formed from a thermoplastic vulcanizate composition that includes about 20% to about 90% of a continuous phase and about 10% to about 80% of a dispersed phase. The continuous phase includes a thermoplastic polyolefin and the dispersed phase includes an at least partially cross-linked elastomeric polymer. The thermoplastic vulcanizate composition passes a Hot Creep Test at 150° C. in accordance with UL 2556 (2013) and exhibits a dielectric loss of 3 or less when measured at 90° C., 60 Hz, and 80V/mil.

According to another embodiment, a method of forming a cable with a covering includes providing a conductor, extruding a thermoplastic vulcanizate composition around the conductor, and curing the thermoplastic vulcanizate composition by dynamically cross-linking the elastomer polymer. The thermoplastic vulcanizate composition includes about 20% to about 90% of a continuous phase and about 10% to about 80% of a dispersed phase. The continuous phase includes a thermoplastic polyolefin and the dispersed phase includes an elastomeric polymer. The thermoplastic vulcanizate composition passes a Hot Creep Test at 150° C. in accordance with UL 2556 (2013) and exhibits a dielectric loss of 3 or less when measured at 90° C., 60 Hz, and 80V/mil.

BRIEF DESCRIPTION OF THE DRAWINGS

FIG. 1 depicts a perspective view of one example of a power cable having one or more insulation and jacket layers formed from a thermoplastic vulcanizate composition according to one embodiment.

DETAILED DESCRIPTION

Generally, an improved cable covering composition can be used to form one or more insulation layers or jacket layers around a cable (e.g., a power cable). The covering composition (e.g., thermoplastic vulcanizate ("TPV") composition) can have a continuous phase of a thermoplastic polyolefin and a dispersed phase of an at least partially cross-linked elastomeric polymer. Cable coverings produced from such polymeric blends can have a variety of advantageous properties and can be both efficiently produced and applied. For example, such a thermoplastic vulcanizate composition can pass a Hot Creep Test at 150° C. in accordance with UL 2556 (2013), and can exhibit a dielectric loss (expressed as tan δ) of 3 or less when measured at 90° C., 60 Hz and 80V/mil. A cable formed with such a TPV composition can have a breakdown strength of at least 400 V/mil when the rate of voltage increase used to measure breakdown strength is 1.0 kV/sec when measured in accordance with ICEA S-94-649 (2013). As can be appreciated, such blends of polymers can, in certain embodiments, be advantageously formed and applied as a thermoplastic vulcanizate. The cable covering can additionally, in certain embodiments, be recyclable.

In certain embodiments, a TPV composition can contain no fire retardant. "No fire retardant" or "fire retardant free" or the like is used herein to mean that the composition is substantially free of fire retardant, but may contain fire retardant in trace amounts of less than about 1% by weight of the total composition, more preferably less than about 0.1%.

The continuous phase of a TPV composition can be formed from any suitable thermoplastic polyolefin. Suitable polyolefins can generally be selected from any polymer produced from alkenes having the general formula $C_nH_{2n}$. Additionally, a suitable polyolefin resin can also be selected from homopolymers of olefins, interpolymers of one or more olefins, or about 40 mole percent, or more, of one or more monomers which are copolymerizable with such olefins.

In certain embodiments, a suitable thermoplastic polyolefin resin can be selected from polypropylene, polyethylene or a combination thereof. Additionally, or alternatively, other suitable thermoplastic polyolefins can include homopolymers of ethylene, propylene, butene-1, isobutylene, hexene, 1,4-methylpentene-1, pentene-1, octene-1, nonene-1, decene-1, copolymers thereof, or combinations thereof. As can be appreciated, any suitable thermoplastic polyolefin can be prepared through a variety of methods. For example, the thermoplastic polyolefin can be prepared with a peroxide, a Ziegler-Natta catalyst, or a metallocene catalyst, as known in the art. Examples of suitable metallocene-catalyzed olefin copolymers are disclosed in U.S. Pat. Nos. 6,451,894; 6,376,623; and 6,329,454 each of which is hereby incorporated by reference.

According to certain embodiments, a suitable thermoplastic polyolefin for the continuous phase can also be a blend of two or more of the above-mentioned homopolymers or interpolymers. For example, such a blend can be a uniform mixture of one of the above systems with one or more of the following: polypropylene, low density polyethylene, high density polyethylene, polybutene-1 or polar monomer-containing olefin copolymers such as ethylene/acrylic acid copolymers, ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers, or ethylene/acrylic acid/vinyl acetate terpolymers.

As can be appreciated, certain thermoplastic polymers can be used in multiple forms. For example, suitable polypropylene (PP) polyolefins can include atactic, syndiotactic or isotactic polypropylene, and be copolymerized with alpha olefin copolymers. Such polypropylene polymers can also include homopolymers of propylene, interpolymers of propylene with minor proportions of ethylene, or polypropylene grafted with other $C_1$-$C_{12}$ olefins. In certain embodiments, polypropylene systems can be randomly polymerized with ethylene or can be a block copolymer formed by linking a number of ethylene units.

Similarly, further examples of suitable thermoplastic polyolefins can include polyethylene (PE) and its alpha olefin copolymers. Examples of such polyethylene polyolefins can include low pressure, substantially linear, ethylene homopolymers and interpolymers of ethylene with alpha-olefins having 3 to 10 carbon atoms including, for example, interpolymers known as linear low density polyethylene ("LLDPE"). Other, polyethylene polyolefins, such as low-density polyethylene ("LDPE"), medium-density polyethylene ("MDPE"), high-density polyethylene ("HDPE"), ultra-high molecular weight polyethylene ("UHMWPE"), and combinations thereof can also be used.

According to certain embodiments, the melting point temperature of a suitable thermoplastic polyolefin can be about 110° C. or more, about 130° C. or more in certain embodiments, and about 150° C. or more in certain embodiments.

In certain embodiments, TPV compositions can include, by weight of the total composition, about 20% to about 90% of the thermoplastic polyolefin continuous phase, in certain embodiments, about 30% to about 80% of the thermoplastic polyolefin continuous phase and in certain embodiments, about 40% to about 70% of the thermoplastic polyolefin continuous phase.

The dispersed phase of a TPV composition can be formed from an at least partially cross-linked elastomeric polymer. The cross-linked elastomeric polymer can be the same polymer included in the continuous phase or can be a different polymer than the polymer included in the continuous phase. Generally, in embodiments using similar polymers in both the continuous and dispersed phases, the polymer in the dispersed phase can differ from the thermoplastic polymer of the continuous phase by being partially, or fully, cross-linked. Additionally, in certain embodiments, a cross-linked elastomeric polymer can have a glass transition temperature of −10° C. or less. Non-limiting examples of suitable cross-linked elastomers include ethylene propylene diene monomer ("EPDM") rubber, butyl rubber, halogenated butyl rubber, ethylene-propylene copolymers with ethylidene norbornene ("ENB"), ethylene-propylene copolymers with vinyl norbornene ("VNB"), styrene-butadiene rubber ("SBR"), polyisoprene ("IR"), natural rubber ("NR"), nitrile rubber ("NBR"), polybutadiene, polychloroprene, ethylene-propylene rubber, a random propylene polymer, or a combination thereof. In certain embodiments, a suitable cross-linked elastomeric polymer can be EPDM rubber.

In certain embodiments, the cross-linked elastomeric polymer can additionally, or alternatively, be a polyolefin. For example, a suitable polyolefin is an ethylene, alpha-olefin, diene monomer such as 5-ethylidene-2-norbornene, 1,4-hexadiene, 1,6 octadiene, 5-methyl-1,4 hexadiene, 3,7-dimethyl-1,6-octadiene, vinyl norbornene or a combination thereof. Suitable ethylene, alpha-olefin diene polyolefins can contain ethylene, based on the total weight of the polymer, in the range of about 50 mole percent to about 90 mole percent in certain embodiments, from about 50 mole percent to about 70 mole percent in certain embodiments, and from about 50 mole percent to about 65 mole percent in certain embodiments. Similarly, the diene content of a suitable ethylene, alpha-olefin, diene polyolefin can range from about 0.2 mole percent to about 5.0 mole percent in certain embodiments, about 0.3 mole percent to about 3.0 mole percent in certain embodiments, about 0.4 mole percent to about 2.5 mole percent in certain embodiments, and from about 0.4 mole percent to about 1.0 mole percent in certain embodiments. The remaining balance of the ethylene, alpha-olefin, diene polyolefin can include an alpha-olefin, selected from the group of propylene, butene-1, hexene-1,4-methyl-1-pentene, octene-1, decene-1, or the like. Particularly suitable alpha-olefins can include propylene, hexene-1, octene-1, and combinations thereof. The alpha-olefins can be present in the elastomeric polymer from about 10 mole percent to about 50 mole percent in certain embodiments, about 30 mole percent to about 50 mole percent in certain embodiments, and from about 35 mole percent to about 50 mole percent in certain embodiments. In certain embodiments, the cross-linked elastomeric polyolefin can alternatively be a siloxane based polymer.

In certain embodiments, the cross-linked elastomeric polymer can also, or alternatively, be a random propylene polymer. Examples of suitable random propylene polymers can have an average propylene content, on a molar basis, of about 68 mol percent to 95 mol percent in certain embodiments, about 70 mol percent to about 92 mol percent in certain embodiments, about 72 mol percent to about 89 mol percent, and from about 75 mol percent to about 87 mol percent in certain embodiments. The balance of the random propylene polymer can include one or more alpha-olefins having from 4 to 8 carbon atoms, such as, for example, ethylene, and/or one or more diene monomers. The random propylene polymer can contain about 5 mol percent to about 32 mol percent, of a C2 and/or a C4-C20 olefin in certain embodiments, about 8 mol percent to about 30 mol percent in certain embodiments, about 11 mol percent to about 28 mol percent in certain embodiments, and from about 13 mol percent to about 25 mol percent in certain embodiments. The random propylene polymer can have a weight average molecular weight (Mw) of 5,000,000 or less in certain embodiments, a number average molecular weight (Mn) of about 3,000,000 or less in certain embodiments, a z-average molecular weight (Mz) of about 5,000,000 or less in certain embodiments, and/or a g' index of about 0.5-0.99 measured at the weight average molecular weight (Mw) of the polymer using isotactic polypropylene as the baseline in certain embodiments. The molecular weights can generally be determined by any suitable technique such as size exclusion chromatography (e.g., 3D SEC or GPC-3D). As illustrative examples, a suitable random propylene polymer can have a Mw of about 5,000 g/mole to about 5,000,000 g/mole in certain embodiments, about 10,000 g/mole to 1,000,000 g/mole in certain embodiments, about 20,000 g/mole to about 500,000 g/mole in certain embodiments, about 30,000 g/mole to about 500,000 g/mole in certain embodiments, and from about 50,000 g/mole to about 300,000 g/mole in certain embodiments.

The elastomer of the dispersed phase can be cross-linked at any suitable point of the manufacturing process including at points both prior to extrusion onto a cable as well as after-extrusion of the TPV composition onto a cable. As can be appreciated however, the elastomer of the dispersed phase can also be fully, or partially, dynamically cross-linked during the extrusion process. For example, in certain such dynamic cross-linking processes, a peroxide free-radical initiator can be used as a cross-linking agent that activates during the extrusion step. As can be appreciated, certain peroxide free-radical initiators can also advantageously decompose at the temperature of dynamic cross-linking. Examples of suitable peroxide free-radical initiators that can be used for dynamic cross-linking can include 2,5-dimethyl-2,5-di-{t-butylperoxy)-3-hexyne; t-butyl peroxybenzoate; 2,5-dimethyl-2,5-di-(t-butylperoxy)-2,5-dimethylhexane; dicumyl peroxide; $\alpha,\alpha$-bis(t-butylperoxy)-2,5-dimethylhexane; and the like.

Alternatively, or additionally, organic multi-olefinic cross-linking agents can be used. Examples of suitable organic multiolefinic cross-linking co-agents can include, but are not limited to, diethyleneglycol diacrylate; diethyleneglycol dimethacrylate; N, N'-m-phenylene dimaleimide; triallylisocyanurate; trimethylolpropane trimethacrylate; tetraallyloxyethane; triallyl cyanurate; tetramethylene diacrylate; polyethylene glycol dimethacrylate; and the like.

The actual mixing of components and subsequent dynamic cross-linking can be performed using any method known to those skilled in the art. For example, the mixing of components and dynamic cross-linking can be performed either in a batch mode or in a continuous mode using conventional melt blending equipment as generally practiced in the art.

In certain embodiments, the cross-linking process can be further modified. For example, partial cross-linking of the dispersed phase can occur before an extrusion step and can be fully, or more completely, dynamically cross-linked during the extrusion process. As can be appreciated, dynamic cross-linking can generally improve the processability of a TPV composition while retaining the benefits of a traditional cross-linked covering.

Useful elastomers for the dispersed phase can include those having a cross-link density/gel content, when measured in accordance to ASTM D2765 (2011), of about 5% to about 75%, those having a cross-link density/gel content of about 10% to about 60%, and those having a cross-link density/gel content of about 25% to about 50% when measured in comparison to the total weight of the composition.

Generally, the dispersed phase can be about 10% to about 80% by weight of the TPV composition by in certain embodiments, about 20% to about 70% by weight of the TPV composition in certain embodiments, and about 30% to about 60% by weight of the TPV composition in certain embodiments. In certain embodiments, the dispersed phase can also be present as small particles, having a mean particle size of, for example, less than about 100 microns in certain embodiments, and less than about 10 microns in certain embodiments.

In certain embodiments, the TPV composition can optionally include fillers (such as reinforcing fillers, thermal conductivity fillers, emissivity fillers, and combinations thereof) and additives (such as nucleating agents, antioxidant, UV stabilizers, heat stabilizers, processing aids, colorants, metal deactivators, and combinations thereof) that are generally used in insulated wires or cables, in suitable ranges. Any such components can be present in the continuous phase, the dispersed phase, or both phases.

Examples of suitable fillers, can include clay (including treated, or untreated, anhydrous aluminum silicate, and calcined clay), mica, talc, zinc oxide, tin oxides, molybdenum oxides, silica (including precipitated silica, hydrophilic fumed silica and fused silica), or combinations thereof. Other suitable fillers can include calcium silicate, calcium carbonate, boron nitride, magnesium oxide, aluminum nitride, aluminum oxide, silicon dioxide, or combinations thereof. As can be appreciated, any of the fillers can also be optionally treated with functional groups such as silane and/or siloxane to improve their properties and functionality. For example, siloxane treated calcined clay can be used as a particularly effective filler. Additionally, aluminum oxide and silicon dioxide can optionally be supplied as spherical alumina and spherical silica respectively.

In certain embodiments, the fillers can also be advantageously used as nano sized particles. In certain embodiments, the filler, when present at specific concentrations, can also be used to improve the thermal conductivity of the TPV composition. For example, filler can increase the thermal conductivity of a TPV composition to about 0.20 W/m/K or more in certain embodiments or to about 0.25 W/m/K or more in certain embodiments. In such embodiments, the filler can be included at about 1% to about 25%, by weight, of the TPV composition, at about 4% to about 20% by weight of the TPV composition in certain embodiments, or at about 8% to about 17% by weight of the TPV composition in certain embodiments.

Certain fillers can also be used to increase the emissivity of the composition. Examples of such fillers can include, for example, metal carbides, metal borides, metal oxides, metal silicides, metal nitrides, and the like. Specific examples of emissivity fillers include silicon hexaboride, silicon tetraboride, silicon carbide, boron carbide, boron silicide, molybdenum disilicide, tungsten disilicide, zirconium diboride, cupric chromite, gallium oxide, cerium oxide, zirconium oxide, manganese oxide, chromium oxides, copper chromium oxide, titanium dioxide, aluminum oxide, magnesium oxide, calcium oxide, cobalt oxide, bismuth oxide, lanthanum oxide, lithium oxide, neodymium oxide, niobium oxide, vanadium oxide, zinc oxide, iron oxide, nickel oxide, or combinations thereof. An emissivity filler can be added to the TPV compositions, by weight, at quantities varying from about 1% to about 20% in certain embodiments, from about 2% to about 15% in certain embodiments, and from about 3% to about 10% in certain embodiments.

Nucleating agents can be used in certain embodiments to increase the crystallization temperature of a thermoplastic polymer. Examples of suitable nucleating agents include organic or inorganic substances that increase the crystallization temperature of thermoplastic by at least 5° C. as determined by differential scanning calorimetry at a cooling rate of 10° C./min. Useful nucleating agents can be either homogeneous nucleating agents (i.e., melt-soluble agents that dissolve into the polyolefin) or heterogeneous nucleating agents (i.e., melt-insoluble agents that are suspended or dispersed in the polyolefin). In certain embodiments, suitable nucleating agents can promote at least one crystal polymorph for the polyolefin. For example, when the polyolefin is isotactic polypropylene (iPP), known crystal forms include the alpha, beta, and gamma polymorphs; and useful nucleating agents include those that promote alpha crystals in iPP, those that promote beta crystals in iPP, and those that promote gamma crystals in iPP. Suitable nucleating agents also include those that promote crystallization in syndiotactic polypropylene (sPP).

An illustrative list of suitable nucleating agents can include fillers such as silica, kaolin, and talc; metal salts including sodium salts, lithium salts, potassium salts, phosphonic acid salts, carboxylate salts, and aromatic carboxylic-acid salts (including norbornene carboxylic-acid salts); metal phosphates (including sodium phosphates), phosphate esters, and phosphate ester salts; metal salts of suberic acid (including the calcium salt); metal salts of hexahydrophthalic acid; salts of disproportionated rosin esters; sorbitol derivatives, including dibenzylidene sorbitol and derivatives, sorbitol acetal and derivatives, and sorbitol di-acetal and derivatives; quinacridone dyes; carboxamide derivatives, including naphthalene carboxamide derivatives; benzenetrisamide derivatives, including 1,3,5-benzenetrisamides; trimesic acid derivatives; and polymeric nucleating agents such as poly(3-methyl-1-butene), poly(dimethyl styrene), poly(ethylene terephthalate), polyamides (nylons), and polycarbonates. Specific examples of suitable nucleating agents can include sodium benzoate, sodium naphthenoate, sodium 2,2'-methylenebis(4,6-di-tert-butylphenyl) phosphate, aluminum 2,2'-methylenebis(4,6-di-tert-butylphenyl) phosphate, di(p-tolylidene)sorbitol, dibenzylidene sorbitol, di(p-methylbenzylidene)sorbitol, di(p-ethylbenzylidene)sorbitol, bis(3,4-dimethylbenzylidene)sorbitol, N',N'-dicyclohexyl-2,6-naphthalenedicarboxamide, and combinations thereof.

Generally, a suitable nucleating agent can be included, by weight of the composition, at quantities ranging from about 0.1% to about 10% in certain embodiments, from about 0.2% to about 3% in certain embodiments, and from about 0.5% to about 1% in certain embodiments.

According to certain embodiments, a thermoplastic vulcanizate composition can optionally include one or more of an ultraviolet ("UV") stabilizer, a light stabilizer, a heat stabilizer, a lead stabilizer, a metal deactivator; or any other suitable stabilizer.

Suitable UV stabilizers can be selected, for example, from compounds including: benzophenones, triazines, banzoxazinones, benzotriazoles, benzoates, formamidines, cinnamates/propenoates, aromatic propanediones, benzimidazoles, cycloaliphatic ketones, formanilides, cyanoacrylates, benzopyranones, salicylates, and combinations thereof. Specific examples of UV stabilizers can include 2,2"-methylenebis(6-(2H-benzotriazol-2-yl)-4-(1,1,3,3,tetramethylbutyl) phenol, available as LA-31 RG from Adeka Palmarole (Saint Louis, France) having CAS #103597-45-1; and 2,2'-(p-phenylene) bis-4-H-3,1-benzoxazin-4-one, available as Cyasorb UV-3638 from Cytec Industries (Stamford, Conn.) and having CAS #18600-59-4.

Hindered amine light stabilizers ("HALS") can be used as a light stabilizer according to certain embodiments. HALS can include, for example, bis(2,2,6,6-tetramethyl-4-piperidyl)sebaceate; bis(1,2,2,6,6-tetramethyl-4-piperidyl)sebaceate+methyl1,2,2,6,6-tetramethyl-4-piperidyl sebaceate; 1,6-hexanediamine, N,N'-bis(2,2,6,6-tetramethyl-4-piperidyl)polymer with 2,4,6 trichloro-1,3,5-triazine, reaction products with N-butyl2,2,6,6-tetramethyl-4-piperidinamine; decanedioic acid, bis(2,2,6,6-tetramethyl-1-(octyloxy)-4-piperidyl)ester, reaction products with 1,1-dimethylethylhydroperoxide and octane; triazine derivatives; butanedioc acid, dimethylester, polymer with 4-hydroxy-2,2,6,6-tetramethyl-1-piperidine ethanol; 1,3,5-triazine-2,4,6-triamine,N,N'''-[1,2-ethane-diyl-bis[[[4,6-bis-[butyl(1,2,2,6,6pentamethyl-4-piperdinyl)amino]-1,3,5-triazine-2-yl]imino-]-3,1-propanediyl]]bis[N',N''-dibutyl-N',N''bis(2,2,6,6-tetramethyl-4-pipe-ridyl); and/or bis (1,2,2,6,6-pentamethyl-4-piperidinyl) sebacate; poly[[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid, 3,5-bis(1,1-dimethyl-ethyl)-4-hydroxy-C7-C9 branched alkyl esters and/or isotridecyl-3-(3,5-di-tert-butyl-4-hydroxyphenyl) propionate. In one embodiment, a suitable HALS can be bis(1,2,2,6,6-pentamethyl-4-piperidinyl) sebacate.

A heat stabilizer can include, but is not limited to, 4,6-bis (octylthiomethyl)-o-cresol dioctadecyl 3,3'-thiodipropionate; poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid, 3,5-bis(1,1-dimethyl-ethyl)-4-hydroxy-C7-C9 branched alkyl esters; Isotridecyl-3-(3,5-di-tert-butyl-4-hydroxyphenyl) propionate. According to some embodiments, the heat stabilizer can be 4,6-bis (octylthiomethyl)-o-cresol; dioctadecyl 3,3'-thiodipropionate and/or poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]].

A suitable lead stabilizer can include a lead oxide, such as for example, red lead oxide $Pb_3O_4$. However, as will be appreciated, any other suitable lead stabilizer can also be used alone or in combination with red lead oxide. In certain embodiments, however, the TPV composition can alternatively be substantially lead-free. As will be appreciated, lead-free compositions can be advantageous for safety reasons and can allow for wider usage of the compositions.

A suitable metal deactivator can include, for example, N,N'-bis(3-(3,5-di-t-butyl-4-hydroxyphenyl)propionyl)hydrazine, 3-(N-salicyloyl)amino-1,2,4-triazole, and/or 2,2'-oxamidobis-(ethyl 3-(3,5-di-t-butyl-4-hydroxyphenyl)propionate).

According to certain embodiments, a suitable antioxidant can include, for example, amine-antioxidants, such as 4,4'-dioctyl diphenylamine, N,N'-diphenyl-p-phenylenediamine, and polymers of 2,2,4-trimethyl-1,2-dihydroquinoline; phenolic antioxidants, such as thiodiethylene bis[3-(3,5-di-tert-butyl-4-hydroxyphenyl)propionate], 4,4'-thiobis(2-tert-butyl-5-methylphenol), 2,2'-thiobis(4-methyl-6-tert-butylphenol), benzenepropanoic acid, 3,5 bis(1,1 dimethylethyl) 4-hydroxy benzenepropanoic acid, 3,5-bis(1,1-dimethylethyl)-4-hydroxy-C13-15 branched and linear alkyl esters, 3,5-di-tert-butyl-4hydroxyhydrocinnamic acid C7-9-Branched alkyl ester, 2,4-dimethyl-6-t-butylphenol Tetrakis {methylene3-(3',5'-ditert-butyl-4'-hydroxyphenol)propionate) methane or tetrakis {methylene3-(3',5'-ditert-butyl-4'-hydrocinnamate}methane, 1,1,3tris(2-methyl-4hydroxyl5butylphenyl)butane, 2,5,di t-amyl hydroqunone, 1,3,5-tri methyl2,4,6tris(3,5di tert butyl4hydroxybenzyl) benzene, 1,3,5tris(3,5di tert butyl4hydroxybenzyl)isocyanurate, 2,2Methylene-bis-(4-methyl-6-tert butyl-phenol), 6,6'-di-tert-butyl-2,2'-thiodi-p-cresol or 2,2'-thiobis(4-methyl-6-tert-butylphenol), 2,2ethylenebis(4,6-di-t-butylphenol), triethyleneglycol bis{3-(3-t-butyl-4-hydroxy-5methylphenyl)propionate}, 1,3,5tris(4tert butyl3hydroxy-2,6-dimethylbenzyl)-1,3,5-triazine-2,4,6-(1H,3H,5H)trione, 2,2methylenebis{6-(1-methylcyclohexyl)-p-cresol}; and/or sulfur antioxidants, such as bis(2-methyl-4-(3-n-alkylthiopropionyloxy)-5-t-butylphenyl)sulfide, 2-mercaptobenzimidazole and its zinc salts, pentaerythritol-tetrakis(3-lauryl-thiopropionate), or combinations thereof. As can be appreciated, a blend of multiple antioxidants can also be used such as, for example, a blend of zinc 2-mercaptobenzimidazole and/or polymeric 2,2,4-trimethyl-1,2-dihydroquinoline.

According to certain embodiments, a TPV composition can further include a processing aid additive. As can be appreciated, a processing aid can be used to improve the processability of the TPV composition by forming a microscopic dispersed phase within the polymer carrier. During processing, the applied shear can separate the process aid (e.g., processing oil) phase from the carrier polymer phase. The processing aid can then migrate to the die wall to gradually form a continuous coating layer to reduce the backpressure of the extruder and reduce friction during extrusion. The processing aid can generally be a lubricant, such as, stearic acid, silicones, anti-static amines, organic amities, ethanolamides, mono- and di-glyceride fatty amines, ethoxylated fatty amines, fatty acids, zinc stearate, stearic acids, palmitic acids, calcium stearate, zinc sulfate, oligomeric olefin oil, or combinations thereof. In certain embodiments, the processing aid can be included, by weight, at quantities from about 10% or less of the TPV composition, at about 5% or less of the TPV composition; and at about 1% or less of the TPV composition. In certain embodiments, the TPV composition can alternatively be substantially free of any processing aid. As used herein, "substantially free" means that the component is not intentionally added to the TPV composition and, or alternatively, that the component is not detectable with current analytical methods. A suitable process aid, if included, is a blend of fatty acids, available commercially as Struktol, Ultraflow, Moldwiz, or Aflux.

The processing aid can also, or alternatively, include a dielectric fluid (or extending oil), such as an aliphatic oil, to improve low temperature flexibility and process ability. Examples of suitable dielectric fluids include mineral oils, such as naphthenic oils, aromatic oils, paraffinic oils, polyaromatic oils; liquid paraffins and vegetable oils, such as soybean oil, linseed oil, and castor oil; oligomeric aromatic polyolefins; paraffinic waxes, including, for example, polyethylene waxes, and polypropylene waxes; synthetic oils, including, for example, silicone oils, alkyl benzenes (for example, dodecylbenzene, and di(octylbenzyl)toluene), aliphatic esters (including, for example, tetraesters of pentaerythritol, esters of sebacic acid, phthalic esters), olefin oligomers (including, for example, optionally hydrogenated polybutenes or polyisobutenes); and mixtures thereof. Mineral oils can also optionally contain at least one heteroatom selected from oxygen, nitrogen or sulfur.

In certain embodiments, a colorant can be included in a TPV composition. The use of a colorant is not particularly limited and can include, for example, carbon black, cadmium red, iron blue, or combinations thereof.

The total quantity of additives, including any nucleating agents, antioxidant, stabilizers, processing aids, colorants, and metal deactivators, can constitute, by weight, from about 0.5% to about 15% of the TPV composition in certain embodiments, from about 3% to about 10% of the TPV composition in certain embodiments, and from about 5% to about 7% of the TPV composition in certain embodiments.

A specific illustrative example of a TPV composition can include a composition formed of about 40% to about 70% (by weight of the composition) of polypropylene as the continuous phase, and about 30-60% (by weight of the composition) of cross-linked EPDM as the dispersed phase. In other example embodiments, a TPV composition can contain about 40-70% (by weight of the composition) of polypropylene as the continuous phase, about 30-60% (by weight of the composition) of silane grafted LDPE as the dispersed phase, and about 3-10% (by weight of the composition) of additives and fillers.

The polymeric components (e.g., the dispersed and continuous phases) can be prepared using methods known in the art. For example, the thermoplastic resin and elastomeric resin can be mixed with fillers and additives, and compounded using a rubber mill, a Brabender Mixer, a Banbury Mixer, a Buss-Ko Kneader, a Farrel continuous mixer, a twin screw extruder, or any other mixing methods known in the art. The additives and/or the filler can also be optionally premixed before addition to the polymeric component. Mixing times should be sufficient to obtain a homogeneous blend. Generally, all of the components of the TPV composition, including both phases, are blended or compounded together prior to their introduction into an extrusion device from which they are to be extruded onto an electrical conductor.

After the various components of the TPV composition are uniformly admixed and blended together, they can be further processed to fabricate a cable. Prior art methods for fabricating polymer cable insulation or cable jacket are well known, and fabrication of a cable can generally be accomplished by any of the known extrusion methods.

In a typical extrusion method, an optionally heated conductor can be pulled through a heated extrusion die, generally a cross-head die, to apply a layer of melted TPV composition onto the conductor. Upon exiting the die, the applied polymer layer may be passed through a heated section and then a cooling section, generally an elongated cooling bath, to cool. Multiple polymer layers may be applied by consecutive extrusion steps in which an additional layer is added in each step, or with the proper type of die, multiple polymer layers may be applied simultaneously. The insulation can then be cooled and solidified. As can be appreciated, no further curing or degassing step is required, because the curing (cross-linking) of the dispersed phase occurs either before the extrusion step or as part of the extrusion step. For example, in certain embodiments, the dispersed phase can be cured (cross-linked) before being mixed or compounded into the TPV composition. Alternatively, in certain embodiments, cross-linking of the dispersed phase can take place on-line as part of the extrusion process. In such embodiments, a curing agent can be added to the mixture before extrusion in a compounding or a mixing step. The curing agent can then be activated during the extrusion process while the cable is still on-line to cross-link the dispersed phase. In certain additional variations, the dispersed phase can also be partially cross-linked before the extrusion process and can then be further cross-linked during the extrusion process. As can be appreciated however, there is still no separate process step to accomplish curing as the curing is initiated from the heat of the extrusion step itself.

As can be appreciated, power cables can be formed in a variety of configurations including as single-core cables, multi-core cables, tray cables, inter-locked armored cables, and continuously corrugated welded ("CCW") cable constructions. The conductors in such power cables can be surrounded by one or more insulation layers and/or jacket layers. According to certain embodiments, at least one of these insulation layers or jacket layers can be formed with the disclosed TPV composition.

The conductor, or conductive element, of a power cable, can generally include any suitable electrically conducting material. For example, a generally electrically conductive metal such as, for example, copper, aluminum, a copper alloy, an aluminum alloy (e.g. aluminum-zirconium alloy), or any other conductive metal can serve as the conductive material. As will be appreciated, the conductor can be solid, or can be twisted and braided from a plurality of smaller conductors. The conductor can be sized for specific purposes. For example, a conductor can range from a 1 kcmil conductor to a 1,500 kcmil conductor in certain embodiments, a 4 kcmil conductor to a 1,000 kcmil conductor in certain embodiments, a 50 kcmil conductor to a 500 kcmil conductor in certain embodiments, or a 100 kcmil conductor to a 500 kcmil conductor in certain embodiments. The voltage class of a power cable including such conductors can also be selected. For example, a power cable including a 1 kcmil conductor to a 1,500 kcmil conductor and an insulating layer formed from a suitable thermoset composition can have a voltage class ranging from about 1 kV to about 150 kV in certain embodiments, or a voltage class ranging from about 2 kV to about 65 kV in certain embodiments. In certain embodiments, a power cable can also meet the medium voltage electrical properties of ICEA test standard S-94-649-2004.

An example of a medium voltage cable is depicted in FIG. 1. The depicted power cable includes a conductive core (1) surrounded by a conductor shield (2) that is surrounded by an insulating layer (3). The insulating layer (3) is covered by an insulation shield (4) which can be further covered by metal wires or strips (5) that are then grounded upon installation of the cable. The cable is then covered by an outer-most jacketing layer (6). The conductor shield (2) and insulation shield (4) can be made of semi-conductive polymeric material(s). The TPV composition disclosed herein can be used to form one or more of the conductor shield (2), the insulating layer (3), the insulation shield (4), the jacket (6). Advantageously, the TPV composition can be used as both an insulation layer (3) and as the jacket layer (6). In certain embodiments, the insulating layer (4) can made from the disclosed TPV composition, while the conductor shield (3), insulation shield (5), and jacketing layer (6) can be made from one or more of the disclosed TPV composition, a thermoplastic polymer, or a cross-linked polymer. Any known cure method can be used to cure a traditional cross-linked polymer layer such as silane curing, silanol curing, monosil process, platinum curing, peroxide curing, moisture curing, UV curing and e-beam curing. For example, in certain embodiments, an insulation layer formed from a TPV composition can be cured by a peroxide cross-linking agent and a jacket layer formed from a cross-linked polymer can be cured through a moisture curing process.

Examples

Table 1 depicts three compositions used to test hot creep, aging, and electrical properties. The formulations of each of the compositions are depicted in parts. As depicted in Table 2, the TPV compositions of Table 1 (Examples 2 and 3) exhibit superior results to a comparative, non-TPV composition.

TABLE 1

| Component | Trade name | Comparative Example 1 | Inventive Example 2 | Inventive Example 3 |
|---|---|---|---|---|
| Polypropylene impact copolymer | Braskem TI 4007G* (Braskem America Inc) | 100 | — | — |
| Polypropylene-EPDM TPV | Sarlink 3190** (Teknor Apex) | — | 100 | 100 |
| Polymerized 1,2-dihydro-2,2,4-trimethylquinoline | Agerite Resin-D | 0.2 | 0.5 | 0.5 |
| 90% Lead oxide with EPDM masterbatch | TRD P90 | — | 5 | 5 |
| 2',3-bis [[3-[3,5-di-tert-butyl-4-hydroxyphenyl] propionyl]] propionohydrazide | Irganox MD 1024 | 0.2 | — | 0.5 |

*Has a melt flow index of 0.7 g/10 min, measured at 230° C./2.16 kg as per ASTM D-1238 and a melt temperature in the range of 220° C. to 275° C.
**Mixture of cross-linked EPDM particles in a crystalline polypropylene matrix and has a Shore A hardness value about 90, and a specific gravity of 0.95.

Hot Creep Test:

Each of the compositions in Table 1 were subjected to the Hot Creep Test on a dumbbell shaped, 75 mil thickness sample at 130° C. and 150° C. in accordance with UL 2556 (2013). The results of the Hot Creep Test for each example are depicted in Table 2.

Dielectric Constant, Dielectric Loss, and Volume Resistance:

Table 2 also depicts the dielectric constant, dielectric loss, and volume resistance for each of the compositions in Table 1. Before any testing was started, all plaque specimens were conditioned for 24 hours at 70° C. in an air circulating oven. Each measurement was made with a guard ring capacitor set at 2 N/cm2. A guard ring capacitor was used in conjunction with a capacitance and dissipation factor meter. A test voltage of 1.75 kVac (60 Hz) was applied to each plaque to measure capacitance and determine volts per mil (VPM) based on thickness. The dielectric constant is converted from the recorded volts per mil and capacitance measurement. The dielectric loss (expressed as tan δ) and volume resistance was also measured at the same time and at 90° C.

TABLE 2

| Creep Data | | Comparative Example 1 | Inventive Example 2 | Inventive Example 3 |
|---|---|---|---|---|
| Hot Creep % Elongation | | | | |
| at 130° C. | | 34.6 | 9.7 | 8.2 |
| at 150° C. | | Breaks | 18.1 | 12.1 |
| Hot Creep % Set | | | | |
| at 130° C. | | 22.2 | 5.1 | 6.7 |
| at 150° C. | | Breaks | 12.5 | 9.5 |
| Aging Data | Test days | | | |
| Volume resistance (Ohms) | Initial | | 3.9E+11 | 1.9E+12 |
| Volume resistance (Ohms) | 7 Days | | 4.3E+12 | 1.6E+13 |
| Dielectric constant | Initial | | 2.1 | 1.8 |
| Dielectric constant | 7 Days | | 2.3 | 2.0 |
| Dielectric loss (tan δ) | Initial | | 0.63 | 0.36 |
| Dielectric loss (tan δ) | 7 Days | | 0.94 | 0.45 |

As depicted in Table 2, Example 1 is comparative because it fails the Hot Creep Test. Examples 2 and 3 are considered inventive because they pass the Hot Creep Test, and have a dielectric loss tan δ of less than 3 when measured at 90° C., 60 HZ and 80V/mil.

Tables 3 and 4 depict additional TPV compositions. Table 3 includes examples 3 to 7 all of which are comparative. Table 4 includes inventive examples 8 to 15. The comparative examples of Table 3 each fail the Hot Creep Test.

TABLE 3

| Components | | Comparative Examples | | | | |
|---|---|---|---|---|---|---|
| | Description | 4 | 5 | 6 | 7 | 8 |
| PP Copolymer | Adflex Q 200F* from Lyondell Basell | 100 | 85 | 85 | 85 | 85 |
| EPDM 1 | Royaledge 5041** from Lion Copolymer (not cross-linkable) | — | 15 | 15 | — | — |
| EPDM 2 | Royaledge 5041 with dicumyl peroxide pre-mixed (3%) (cross-linkable) | — | — | — | 15 | 15 |
| Talc | Jetfil 575C from Imerys | — | — | 10 | — | 10 |
| Nucleating agent | Millad 3988i from Milliken | — | — | — | — | — |
| Antioxidant | Agerite resin D | 0.2 | 0.2 | 0.2 | 0.2 | 0.2 |
| Metal deactivator | Irganox MD 1024 | 0.2 | 0.2 | 0.2 | 0.2 | 0.2 |
| Heat Stabilizer | Vanox ZMTI | — | — | — | — | — |
| Polyethylene | B 4202*** from Dow | — | — | — | — | — |
| Properties | | | | | | |
| | Hot creep at 150° C. (%) | Fails | 31.8 | 62 | 67 | 55 |
| | Hot creep set at 150° C. (%) | Fails | 12.9 | 34.5 | 32.7 | 38.2 |

*A propylene heterophase copolymer with a melting point temperature of 165° C., melting enthalpy of 30 J/g, a melt flow index of 0.8 dg/min and a flexural modulus of 150 MPa.
**Terpolymer having ethylene (75 wt %), propylene (25 wt %), and dicyclopentadiene (2.8 wt %).
***Cross-linkable low density polyethylene having a specific gravity of 0.92 and a melting point temperature in the range of 116° C. to 140° C.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to

TABLE 4

| Components | | Inventive Examples | | | | | | | |
|---|---|---|---|---|---|---|---|---|---|
| | Description | 9 | 10 | 11 | 12 | 13 | 14 | 15 | 16 |
| PP Copolymer | Adflex Q 200F from Lyondell Basell | 65 | 65 | 65 | 65 | 70 | 60 | 50 | 50 |
| EPDM 1 | Royaledge 5041 from Lion Copolymer (not cross-linkable) | — | — | — | — | — | — | — | — |
| EPDM 2 | Royaledge 5041 with dicumyl peroxide pre-mixed (3%) (cross-linkable) | 35 | 35 | 35 | 35 | 30 | 40 | 50 | — |
| Talc | Jetfil 575C from Imerys | — | 10 | 10 | 20 | 10 | 10 | 20 | 20 |
| Nucleating agent | Millad 3988i from Milliken | — | — | 1 | 1 | — | — | 1 | — |
| Antioxidant | Agerite resin D | 0.2 | 0.2 | 0.2 | 0.2 | 1 | 1 | 0.2 | 0.2 |
| Metal deactivator | Irganox MD 1024 | 0.2 | 0.2 | 0.2 | 0.2 | 0.5 | 0.5 | 0.2 | 0.2 |
| Heat Stabilizer | Vanox ZMTI | — | — | — | — | 0.25 | 0.25 | — | — |
| Polyethylene | B 4202 from Dow | — | — | — | — | — | — | — | 50 |
| Properties | | | | | | | | | |
| | Hot creep at 150° C. (%) | 42.3 | 41.7 | 19.2 | 17 | 15.3 | 38.5 | 22 | 41 |
| | Hot creep set at 150° C. (%) | 4.3 | 7.9 | 2.3 | 0.8 | 3.8 | 3.8 | 1.2 | 1.8 |
| | Dielectric loss-(tan δ) @140° C.-Initial | — | — | — | — | 0.21 | 0.14 | — | — |
| | Dielectric loss-(tan δ) @140° C.-28 days | — | — | — | — | 0.23 | 0.45 | — | — |

What is claimed is:

1. A method of forming a cable with a covering, the method comprising:
providing a conductor;
forming a thermoplastic vulcanizate composition, the thermoplastic vulcanizate composition comprising:
about 20% to about 90%, by weight, of a continuous phase, the continuous phase comprising a thermoplastic polyolefin;
about 10% to about 80%, by weight, of a dispersed phase, the dispersed phase comprising an elastomeric polymer, wherein the elastomeric polymer of the thermoplastic vulcanizate composition is fully cross-linked; and
a metal deactivator; and
extruding the thermoplastic vulcanizate composition around the conductor to form a covering layer; and
wherein the cable exhibits a Hot Creep Elongation at 150° C. of 50% or less and a Hot Creep Set at 150° C. of 5% or less in accordance with UL 2556 (2013) and has a dielectric loss of 3 or less when measured at 90° C., 60 Hz, and 80V/mil.

2. The method of claim 1, wherein the covering layer is one or more of an insulation layer or a jacket layer.

3. The method of claim 1, wherein the cable has a breakdown strength of 400 V/mil or more in accordance with ICEA S-94-649 (2013) using a voltage rate increase of 1.0 kV/sec.

4. The method of claim 1, wherein the cross-linked elastomeric polymer has a glass transition temperature of −10° C. or less.

5. The method of claim 1, wherein the cross-linked elastomeric polymer is an olefin-based copolymer.

6. The method of claim 1, wherein the cross-linked elastomeric polymer comprises one or more of a polyolefin elastomer, an ethylene propylene rubber, an ethylene acrylic rubber, an ethylene propylene diene terpolymer, a silane grafted polyolefin, an ethylene copolymer, and a silicone copolymer.

7. The method of claim 1, wherein the thermoplastic polyolefin has a melting point temperature of about 110° C. or more.

8. The method of claim 1, wherein the thermoplastic polyolefin comprises one or more of polypropylene or copolymers thereof, and wherein the polypropylene and the copolymers thereof each have a melting point temperature of about 150° C. or more.

9. The method of claim 1, wherein the thermoplastic vulcanizate composition comprises about 40% to about 70%, by weight, of the continuous phase, and about 30% to about 60%, by weight, of the dispersed phase.

10. The cable of claim 9, wherein the thermoplastic polyolefin is polypropylene and the cross-linked elastomeric polymer is ethylene propylene diene monomer or silane grafted low density polyethylene.

11. The method of claim 10, wherein the thermoplastic vulcanizate composition further comprises about 3% to about 10%, by weight, of one or more additives.

12. The method of claim 11, wherein the one or more additives is selected from the group consisting of a nucleating agent, an antioxidant, a UV stabilizer, a heat stabilizer, a processing aid, and a curing agent.

13. The method of claim 12, wherein the curing agent comprises a peroxide compound.

14. The method of claim 1, wherein the thermoplastic vulcanizate composition further comprises a filler, and wherein the filler comprises one or more of zinc oxide, magnesium oxide, boron nitride, aluminum nitride, talc, and calcined clay.

15. The method of claim 14, wherein the filler is included at about 1% to about 25%, by weight, of the thermoplastic vulcanizate composition.

16. The method of claim 1, wherein the thermoplastic vulcanizate composition exhibits a thermal conductivity of about 0.20 W/mK or more.

17. The method of claim 1, wherein the dispersed phase has an average particle size of about 100 microns or less.

18. The method of claim 1, wherein the cable is configured to operate at voltages of about 1 kV or more.

19. The method of claim 1, wherein the thermoplastic vulcanizate composition is substantially free of fire retardant.

20. A method of forming a cable with a covering, the method comprising:
providing a conductor;
providing an elastomeric polymer that is at least partially cross-linked;
forming a thermoplastic vulcanizate composition, the thermoplastic vulcanizate composition comprising:
about 20% to about 90%, by weight, of a continuous phase, the continuous phase comprising a thermoplastic polyolefin;
about 10% to about 80%, by weight, of a dispersed phase, the dispersed phase comprising the at least partially cross-linked elastomeric polymer; and
a metal deactivator; and
extruding the thermoplastic vulcanizate composition around the conductor to form a covering layer; and
wherein the cable exhibits a Hot Creep Elongation at 150° C. of 50% or less and a Hot Creep Set at 150° C. of 5% or less in accordance with UL 2556 (2013) and has a dielectric loss of 3 or less when measured at 90° C., 60 Hz, and 80V/mil.

* * * * *